(12) United States Patent
Digby et al.

(10) Patent No.: US 6,647,222 B1
(45) Date of Patent: Nov. 11, 2003

(54) PRINT MEDIA SUPPLY IDENTIFICATION FOR A COPIER OR PRINTER

(75) Inventors: Anthony Digby, Gerrards Cross (GB); Andrew Perkins, Upminster (GB)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 10/165,595

(22) Filed: Jun. 7, 2002

(51) Int. Cl.⁷ .......................... G03G 15/00; G03G 21/00
(52) U.S. Cl. .................. 399/81; 399/8; 399/24
(58) Field of Search ............................. 399/8, 9, 16, 24, 399/81, 83, 391; 358/1.15, 1.16, 1.12; 700/17, 83; 708/173

(56) References Cited

U.S. PATENT DOCUMENTS

| 5,081,595 | A |  | 1/1992 | Moreno et al. ............. 358/1.12 |
| 5,390,005 | A |  | 2/1995 | Kimoto et al. ................ 399/81 |
| 5,835,820 | A |  | 11/1998 | Martin et al. ................. 399/85 |
| 5,923,942 | A |  | 7/1999 | Nuggehalli et al. ......... 399/389 |
| 6,233,414 | B1 |  | 5/2001 | Farrell ......................... 399/81 |
| 6,304,732 | B1 |  | 10/2001 | Myers et al. ................. 399/81 |
| 6,453,129 | B1 | * | 9/2002 | Simpson et al. ............ 399/8 X |
| 2001/0009615 | A1 | * | 7/2001 | Yokobori et al. ......... 399/81 X |

* cited by examiner

Primary Examiner—Sophia S. Chen
(74) Attorney, Agent, or Firm—R. Hutter

(57) ABSTRACT

A digital printer retains in memory detailed alphanumeric data describing the contents of its paper trays, as well as describing any unusual features thereof. The alphanumeric data is entered at the local user interface of the printer, and is retained at the printer so it can be accessed by a remote user computer as needed. The alphanumeric data can be subject to search techniques by which a large number of printers can be searched for certain print media or other properties.

14 Claims, 4 Drawing Sheets

```
Search for Media                                    [X]
Select size:
  ● LTR    ○ LGL    ○ A4    ○ A3    ○ A2

Select type:
  ● Paper    ○ Transparency
  ─────────────────────────────────────────
  Enter freestyle search:
  ┌─────────────────────────────────────┐
  │ Joe's photo-quality blue stock      │
  │                                     │
  │                                     │
  └─────────────────────────────────────┘

Possible locations:
  ┌─────────────────────────────────────┐
  │ DocuCentre 265 - west - "photo blue"│
  │ DocuCentre 480 - east - "Joe's blue"│
  │ DocuPrint N17 - north - "photo paper"│
  │                                     │
  └─────────────────────────────────────┘
```

Search for Media

Select size:
- ● LTR   ○ LGL   ○ A4   ○ A3   ○ A2

Select type:
- ● Paper   ○ Transparency

Enter freestyle search:

> Joe's photo-quality blue stock

Possible locations:

> DocuCentre 265 - west - "photo blue"
> DocuCentre 480 - east - "Joe's blue"
> DocuPrint N17 - north - "photo paper"

*FIG. 4*

PRINT MEDIA SUPPLY IDENTIFICATION FOR A COPIER OR PRINTER

TECHNICAL FIELD

The present invention relates to copiers and printers which can be operated over a network, and more specifically, to systems for identifying types of print media, such as paper, transparency, letterhead, etc. which are available in specific locations among various copiers and printers on the network.

BACKGROUND

In the office-equipment context, such as including copiers and printers, it is generally well known to provide, with each machine, a plurality of selectable trays, each having an identifiable type of print media therein. Different types of media may typically include papers of different sizes or colors, or transparency media. With specific users, however, there may be very specific types of media, such as different types of letterhead or other user-specific forms.

In situations where a plurality of copiers and printers are in communication with various computers through a network, a user originating a print job at a computer will wish to locate a machine having a correct type of media on which to print. Where the selection of available types of media is wide, such as including specific types of letterhead, a user at a computer will wish to have this very specific information about the media in each tray of many machines displayed to him in detail.

In the prior art, however, there are practical constraints on giving a user such a "complete picture": very often the data structures and communication among computers and machines is incapable of describing the media in a particular tray beyond a basic, "choose one of the following" description such as "A4." Also, the fact that machines may be widely distributed geographically, with various machines being under the control of local key operators (who are responsible for maintaining supplies in each tray), creates a danger that a description of the media which is displayed to the user may become incorrect.

DESCRIPTION OF THE PRIOR ART

U.S. Pat. No. 5,081,595 discloses a digital printer/copier in which descriptions of various media supplies are displayed at a user interface.

U.S. Pat. No. 5,390,005 discloses a user interface for a copier, in which displays on a touchscreen may be manually modified.

U.S. Pat. No. 5,835,820 discloses a digital printer/copier in which a description of the contents of a particular paper tray in the machine is entered by a system administrator.

U.S. Pat. No. 5,923,942 discloses a digital printer/copier in which a description of the contents of a particular paper tray in the machine is reflected in the position of a mechanical dial associated with each tray. The dial includes a set of electrical contacts by which the paper size in the tray is communicated electronically to a control system.

U.S. Pat. No. 6,233,414 discloses a network-based system in which status information, including information about paper supplies, about a selected printer on the network is monitored by a user's computer.

U.S. Pat. No. 6,304,732 disclose a digital printer/copier in which a description of the contents of a particular paper tray in the machine is displayed by one of a set of selectable icons which can be "dragged and dropped" for display on a touchscreen in the machine user interface.

SUMMARY OF THE INVENTION

According to one aspect of the present invention, there is provided a method of operating a printer having a remote computer associated therewith, the printing apparatus having a user interface. At the user interface, description data relating to the printer is entered, the description data relating to at least one of a contents of a paper tray associated with the printer, a type of marking material associated with the printer, and a finishing capability associated with the printer. The description data is retained at the printer. The remote computer queries the identification data at the printer.

According to another aspect of the present invention, there is provided a method of operating a plurality of digital printers via a computer, each printer including at least one paper tray, comprising: entering a query into the computer; for each printer, obtaining alphanumeric description data from a memory associated with the printer, the description data relating to at least one of a contents of a paper tray associated with the printer, a type of marking material associated with the printer, and a finishing capability associated with the printer; and displaying at least some of the alphanumeric description data at the computer.

According to another aspect of the present invention, there is provided a printing apparatus, comprising printer hardware, at least one paper tray, a control system operative of the printer hardware, the control system including means for communicating with an external computer over a network, and a user interface associated with the control system, the user interface including means for a user to enter alphanumeric description data relating to a contents of the paper tray. The control system includes means for allowing the alphanumeric description data to be read via the external computer.

BRIEF DESCRIPTION OF THE DRAWINGS

FIG. 4 represents a display associated with a computer selectably operating one of a plurality of printers and copiers.

DETAILED DESCRIPTION

Figure 1:
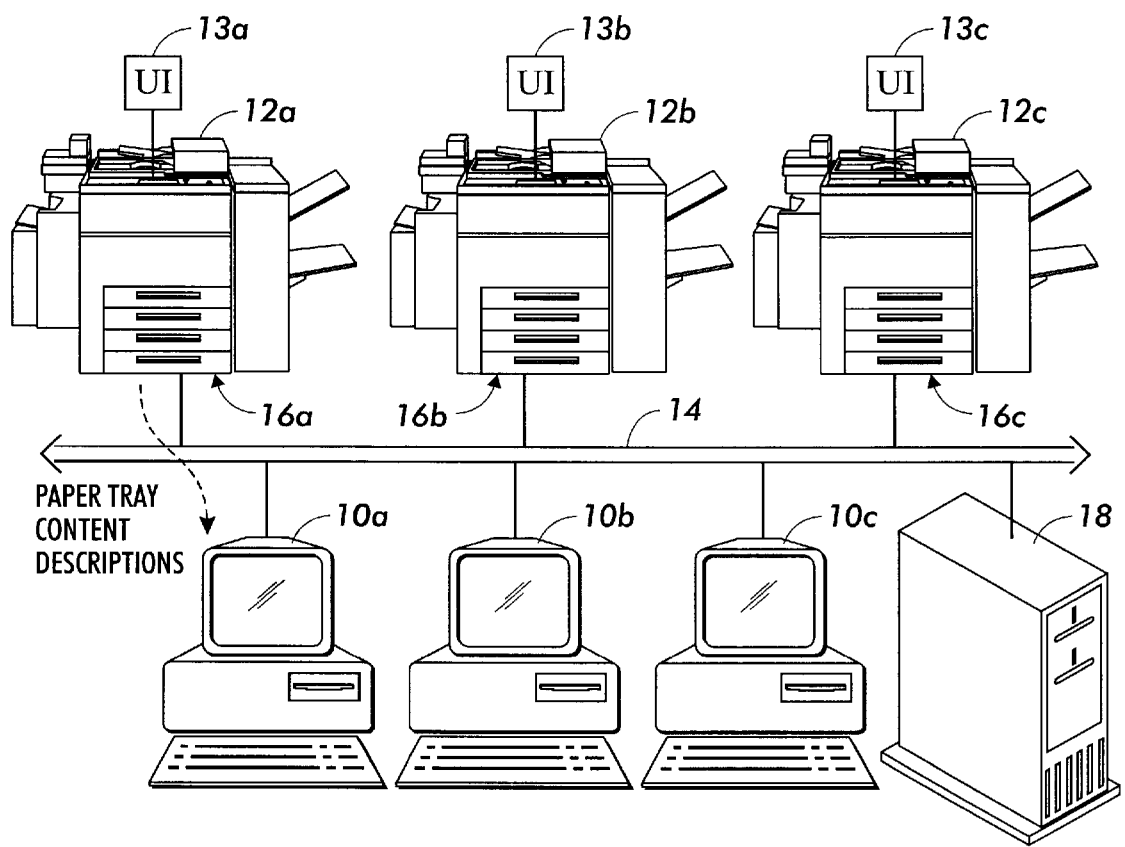
FIG. 1 is a diagram showing a network of user computers which can selectably operate one of a plurality of printers and copiers.

FIG. 1 is a diagram showing a network of user computers which can selectably operate one of a plurality of printers and copiers. (As is familiar in the art, many digital copiers and facsimile machines function as printers, in that they output images based on data originating at a computer, and so for present purposes all such machines shall be referred to as "printers.") Each user computer $10a$, $10b$, . . . is capable of sending print job data to a selected printer $12a$, $12b$, . . . over a network 14. Each printer includes a plurality of what are here called paper trays (but which can be in any physical form and can conceivably retain any kind of print media), collectively labeled $16a$, $16b$, . . . within each printer. Each printer can include thereon a local user interface (UI) $13a$, $13b$. . . , through which instructions can be entered into a control system associated with the machine. In one embodiment, the UI comprises an LCD "touchscreen," as will be described below, but more broadly such a touchscreen can be defined as any variable display.

Figure 2:
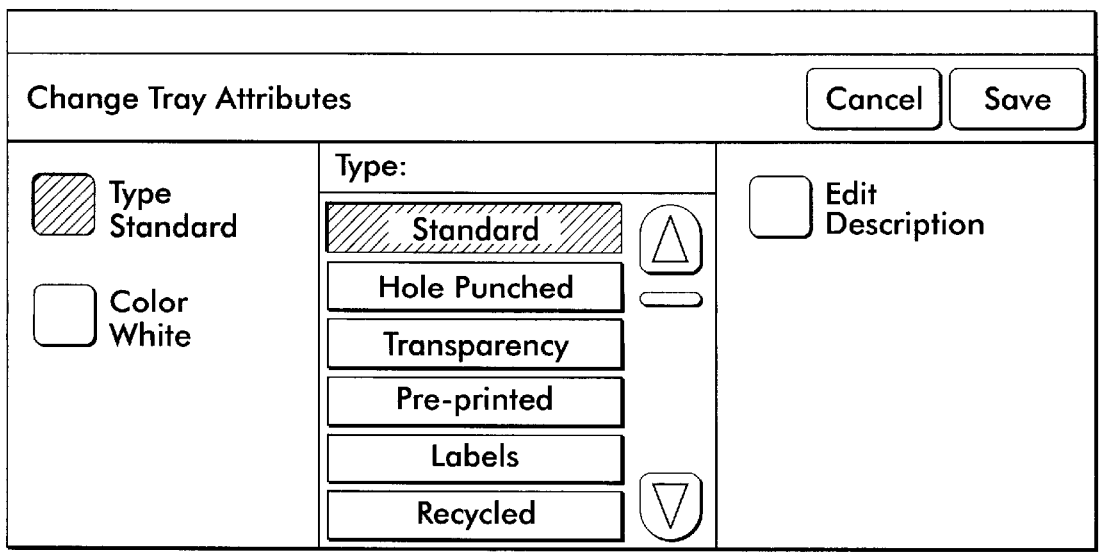
FIGS. 2 and 3 represent two touchscreen views as would appear on a local user interface of a printer.
Figure 3:
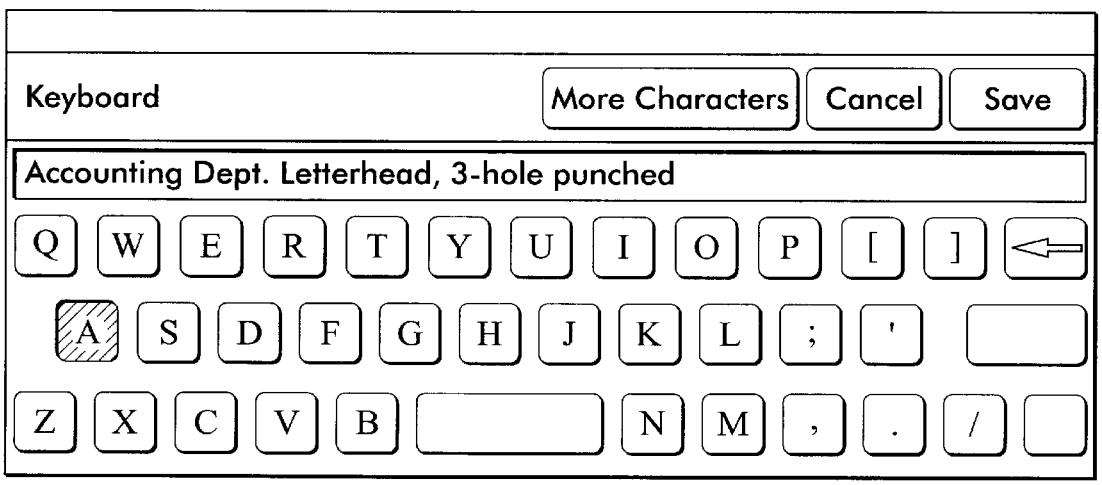

FIGS. 2 and 3 represent two touchscreen views as would appear on one of the UI's 13a, 13b, . . . The FIG. 2 touchscreen display would appear to a key operator who is loading media into a particular printer. The display, which is of course one of many possible displays retained in a memory associated with the UI, includes a list of paper trays of other sources of media within the machine, along with alphanumeric descriptions of the type of media within each tray. There is also on the display a button called "edit description." When one tray description on the list is indicated along with the edit description button, the display is switched to that of FIG. 3.

The display of FIG. 3 is largely of an alphanumeric keyboard. By using the keyboard, a key operator can have an opportunity (typically 256 characters) to enter alphanumeric data forming a very detailed description of the media in a particular tray (as used herein, "description data"). For example, the description can be as simple as "white letter paper" or as specific as "3-hole punched onionskin, president's letterhead." When a return or equivalent key is hit on the FIG. 3 keyboard, the entered description appears in the tray description such as in the FIG. 2 display. Simultaneously, the description data, as associated with each paper tray, is retained in a memory associated with the printer, in a predetermined location where it can be accessed by an external computer.

A practical advantage of the alphanumeric keyboard at the local UI of a machine is that the description may be entered by the person with the most current knowledge of what type of stock is in a particular tray of a particular printer, such as the local key operator responsible for re-loading the printer. As a user of a computer on the network may be located in a building separate from the selected printer, it is desirable that the detailed alphanumeric description of the contents of one paper tray in one accessible machine be displayed and updated as necessary to a user deciding whether to use a particular printer. Also, when the type of contents is changed, the local key operator is well positioned to enter the changed description into the local UI of the printer, thereby providing the best opportunity to keep the description of the paper tray contents updated.

Thus, according to the present embodiment, a system is provided, embodied at least partially in software and memory within the control system of each printer 12a, 12b . . . and within software running on any computer which may request a job. In brief, the alphanumeric character strings describing each tray of a machine are retained in a predetermined location in a memory accessible to the control system of the printer; when the printer is for whatever reason accessed by any computer, the character strings are used to populate a display at the requesting computer, typically within the context of a network-based printer control system, such as Xerox® CentreWare™. This data flow is shown in FIG. 1 between a printer 12a and a computer 10a.

A user, such as at computer 10a, can have access to a large population of printers 12a, 12b, . . . providing a large variety of types of papers or other media to be printed on. The user can, in any of various ways, survey the contents of the trays of any number of printers by reading the character strings which were entered by various local key operators. The user could address one printer on the network and retrieve the descriptions therefrom to see if, for example, the printer which is geographically closest to him contains a certain type of media.

In another embodiment, there is compiled for display to the user a master list of the descriptions of the contents of all trays in all machines accessible to the user. Such a master list is displayed to the user, and the user can then pick the most desirable stock from all of the stock in all of the trays in every machine.

In another embodiment, a master list of all stocks can be made subject to word searches or more sophisticated queries, i.e., "Show all machines having transparency stock," so that a user can locate a machine having the desired media. An example of a window for enabling a search for a desired type of media, as would be displayed to a user at the user's computer, is shown in FIG. 4. As can be seen, certain basic attributes of media, such as size, can be entered through a button interface. For more detailed searches, a space is provided for a "freestyle" search, in which the user can enter words or phrases relating to a type of media he desires. The query terms entered into the space can then be compared to the master list of descriptions of the contents of each tray in each machine on the network, and the best results (alphanumeric descriptions, as well as basic information about the printer in which the media is located) are displayed to the user; from which the user can select what is to him the most desirable stock.

Such queries can further be subject to spell-check and "thesaurus" techniques, within the computer or within the control system of each printer, to take into account different terminology used by different personnel, e.g., "slides" can be recognized as equivalent to "transparencies;" "coated" stock can be recognized as the same as "photo" stock, etc. and vice-versa. Also, subtle variations in terminology relating to color, e.g. pink versus rose, beige versus mauve, can be taken into account in such a manner. The detailed descriptions can further relate to specific personnel or other proper nouns; for instance, if a key operator enters into a local UI "Joe's special stock," a freestyle query can be made simply using the word "Joe," or if Joe is for instance an accountant, using the word "accounting." With regard to specific classes of users, a description such as "stock for patent drawings" can be discovered by a freestyle query using the word "patent." In this way, the flexibility and detail afforded by having the key operators type in descriptions of the media will not be confounded by the arbitrariness of terms used by requesters of the information. As used herein, the term "thesaurus" refers to any method by which the meaning of a discovered word or a word used in a query is related to another word, such as via a look-up table or other means. It is also possible to incorporate such freestyle searches with boolean techniques.

The lower portion of the window of FIG. 4 shows an example of a subset of printers on a network or subnetwork which may fit the freestyle description. Also, in response to such queries, the list of possibly-suitable printers on the network can be prioritized to a user, such as by proximity to the user or other recipient (by office area, floor, building), or by some other parameter such as capability (color printers first) or cost per page, or of course a combination of criteria.

The obtaining of character strings describing the contents of paper trays for display at a particular computer can be carried out in a number of ways. If it is assumed that the character string data describing the tray contents of a printer is resident at the printer, the data can be retrieved or accessed by a requesting user when the user makes a request for such data. In such a case, the user computer can in effect poll all the accessible printers 12a, 12b, . . . and obtain the data as needed, such as incidental to printing a desired job. Alternately, and more likely in a network where there is a dedicated print server such as shown as 18 in FIG. 1, the printers on a given network or subnetwork are periodically polled, such as daily or hourly, and the retrieved description data for all printers is accumulated at the server 18 for access by user computers as needed. The server 18 can also be the residence of the search and thesaurus software which can facilitate searches for particular types of stock. The polling of paper tray contents descriptions can be made in conjunction with other polling operations familiar in network printing, such as for status and error checking of a population of printers.

Figure 5:
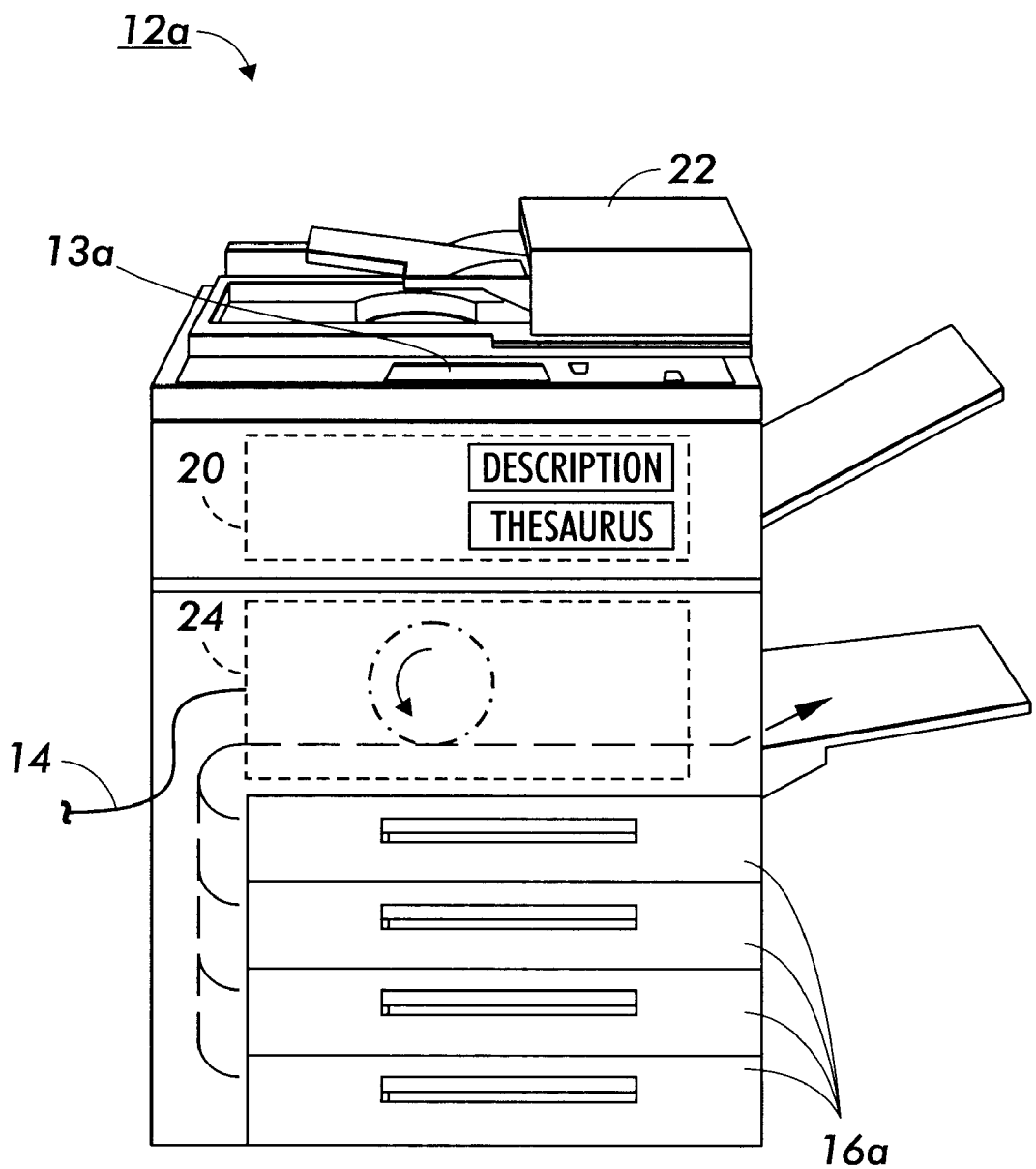
FIG. 5 is a simplified view showing basic elements of a digital copier, including aspects of the present invention.

FIG. 5 is a simplified diagram showing essential elements of a digital copier such as 12a. In addition to the local user interface 13a and the paper trays 16a described above, there is a central control system 20, in the form of a CPU and associated elements as is familiar in the art, which allows the machine to perform typical copier and printer functions. In addition to a scanner 22 for copy functions, there is of course printer hardware 24, typically in the form of a xerographic or ink-jet engine. A key function of the control system 20, as shown, is the ability to retain the alphanumeric descriptions of paper tray contents in a predetermined memory location for access via a network communication system, as well as, in some instances, a program to carry out "thesaurus" functions.

The principles described above can be applied not only to a selection of media, such as paper, in a printing apparatus, but to other specialized items associated with printing and which may be dedicated to a particular printer on a network, such as marking material (e.g. special colored or MICR toners) or unusual finishing capabilities (e.g. booklet making, z-folding, hole-punching). These functions can be described in detail using alphanumeric characters entered at the local user interface of each machine, and which are queried in the above-described manners.

What is claimed is:

1. A method of operating a printer having a remote computer associated therewith, the printer having a user interface, comprising:

entering, at the user interface, description data relating to the printer, the description data relating to at least one of a contents of a paper tray associated with the printer, a type of marking material associated with the printer, and a finishing capability associated with the printer;

retaining the description data at the printer; and the remote computer querying the description data at the printer.

2. The method of claim 1, the entering step including entering the description data through an alphanumeric keyboard.

3. The method of claim 2, the alphanumeric keyboard being manifest in a touchscreen associated with the user interface.

4. The method of claim 1, the querying step occurring incidental to the remote computer requesting a print job from the printer.

5. The method of claim 1, the querying step including the remote computer displaying the description data from the printer.

6. The method of claim 1, the querying step including the remote computer originating a search relating to the description data.

7. The method of claim 6, the querying step including performing a thesaurus step to attempt to relate the search to the description data.

8. A method of operating a plurality of digital printers via a computer, each printer including at least one paper tray, comprising:

entering a query into the computer;

for each printer, obtaining alphanumeric description data from a memory associated with the printer, the description data relating to at least one of a contents of a paper tray associated with the printer, a type of marking material associated with the printer, and a finishing capability associated with the printer; and displaying at least some of the alphanumeric description data at the computer.

9. The method of claim 8, the displaying step including displaying alphanumeric description data obtained from a subset of the plurality of digital printers, the subset conforming to the query.

10. The method of claim 8, further comprising performing a thesaurus step to attempt to relate the query to the alphanumeric description data associated with the printer.

11. The method of claim 8, further comprising a server polling each of the plurality of printers, and retaining a master list of alphanumeric description data for the plurality of printers.

12. A printing apparatus, comprising.

printer hardware;

at least one paper tray;

a control system operative of the printer hardware, the control system including means for communicating with an external computer over a network;

a user interface associated with the control system, the user interface including means for a user to enter alphanumeric description data relating to a contents of the paper tray; and the control system including means for allowing the alphanumeric description data to be read via the external computer.

13. The apparatus of claim 12, further comprising means for relating a query from an external computer to the alphanumeric description data.

14. The apparatus of claim 13, wherein the means for relating a query includes means for performing a thesaurus step.

* * * * *